May 2, 1950          S. I. MacDUFF          2,506,093
POWER STEERING APPARATUS FOR NOSE WHEELS
Filed June 5, 1947          2 Sheets-Sheet 1
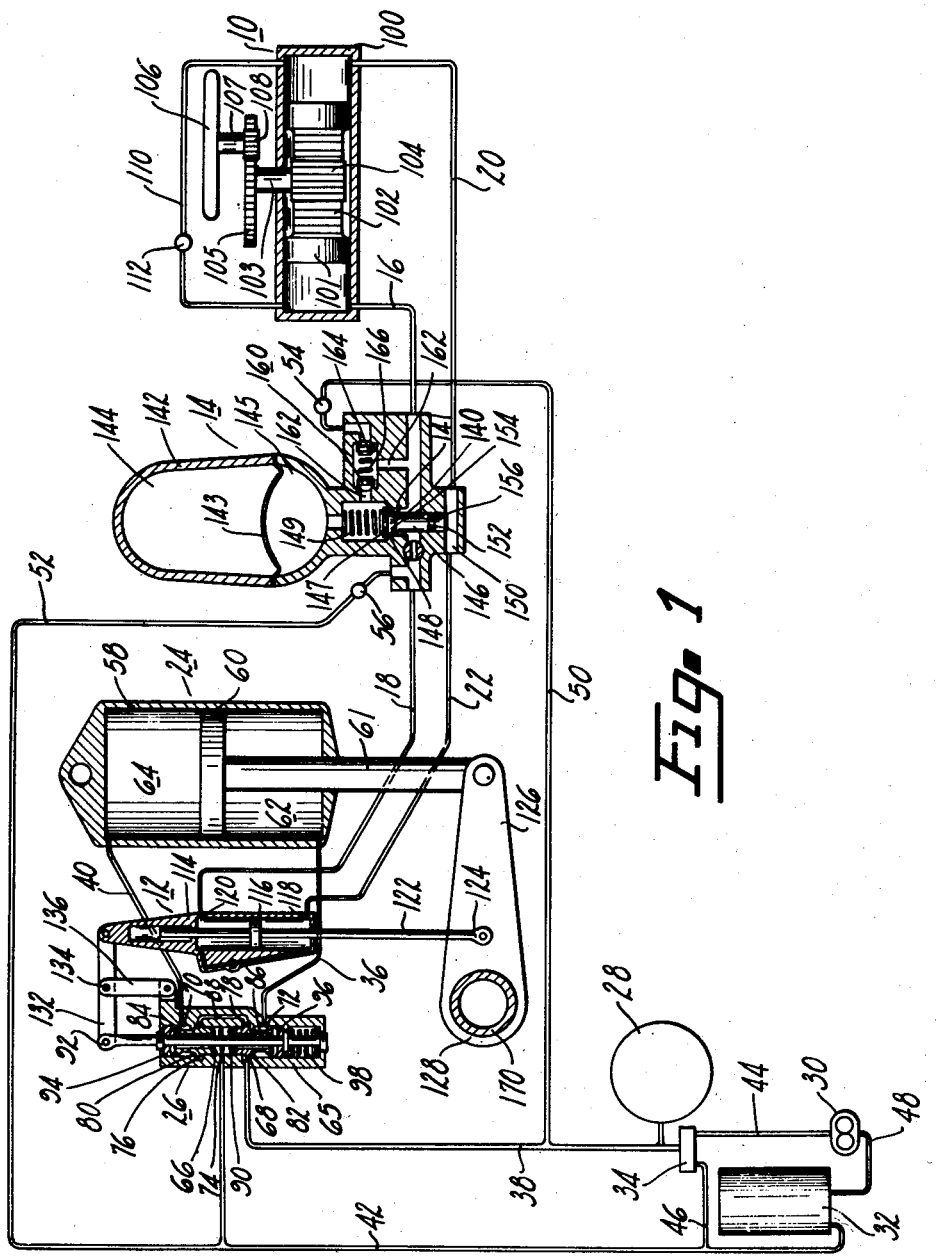
INVENTOR.
STANLEY I. MACDUFF
BY
*Cecil J. Arens*
ATTORNEY May 2, 1950 S. I. MacDUFF 2,506,093
POWER STEERING APPARATUS FOR NOSE WHEELS
Filed June 5, 1947 2 Sheets-Sheet 2
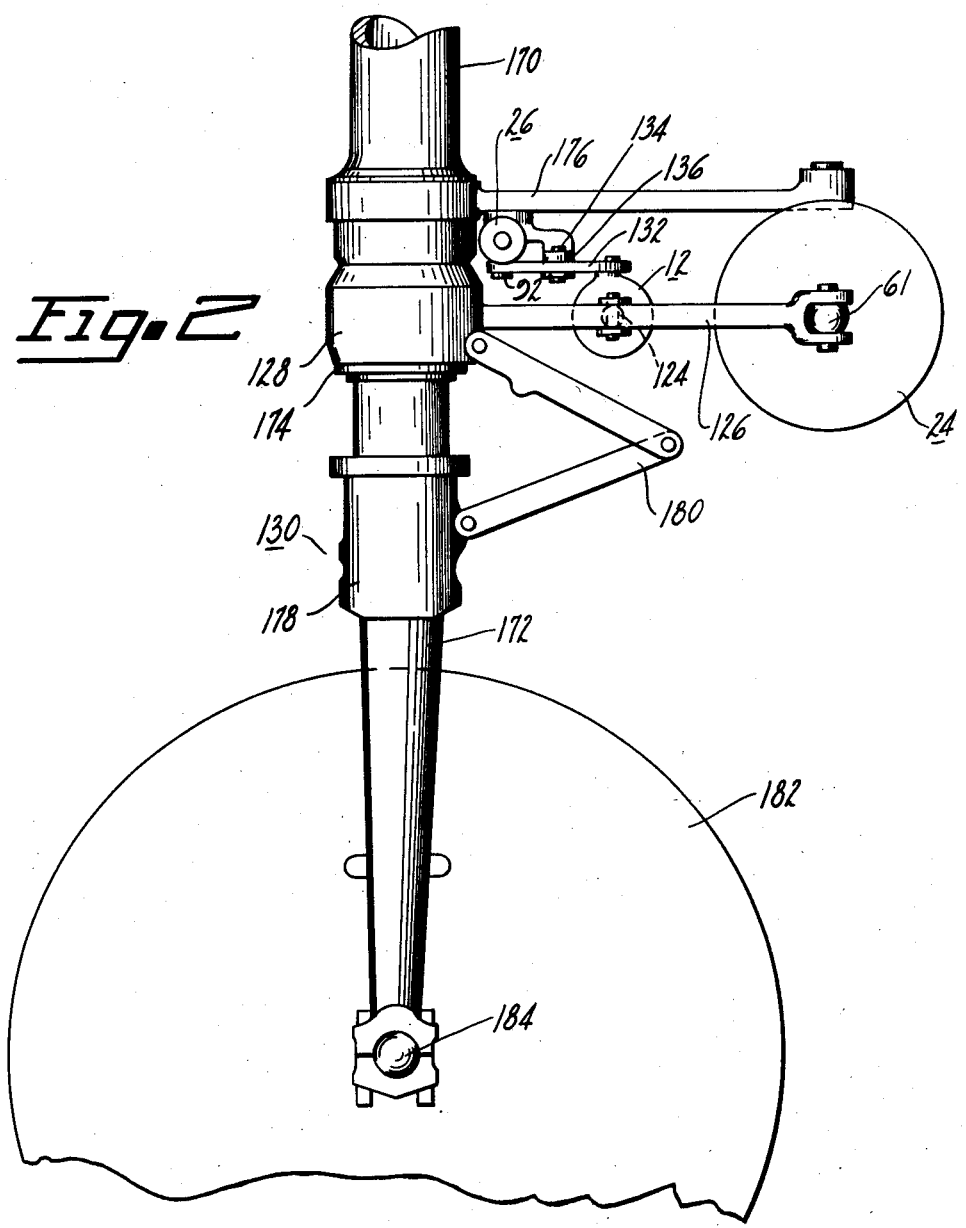
INVENTOR.
STANLEY I. MacDUFF
BY
Cecil E. Arens
ATTORNEY Patented May 2, 1950

2,506,093

UNITED STATES PATENT OFFICE 2,506,093

POWER STEERING APPARATUS FOR NOSE WHEELS

Stanley I. MacDuff, South Bend, Ind., assignor to Bendix Aviation Corporation, South Bend, Ind., a corporation of Delaware Application June 5, 1947, Serial No. 752,737

2 Claims. (Cl. 180—79.2)

This invention relates generally to steering apparatus and more particularly to a steering mechanism for the nose wheel of an aircraft.

One of the important objects of the invention resides in the provision of a power steering apparatus for the nose wheel of an aircraft in which the power for steering is obtained from an open hydraulic system and the control of this power is through the medium of a closed hydraulic circuit.

An important object of the invention lies in the provision of a hydraulic steering apparatus connected to a steered member in a manner to transmit motion thereto whereupon the cause producing said motion is nullified by the movement of said member.

The above and other objects and features of the invention will be apparent from the following description of the apparatus taken in connection with the accompanying drawings which form a part of this specification, and in which:

Figure 1 exemplifies diagrammatically the apparatus of the invention; and

Figure 2 shows parts of the apparatus mounted on a shock strut for guiding the nose wheel associated therewith.

The apparatus of Figure 1 comprises essentially a closed hydraulic system and an open hydraulic system. The closed system includes a transmitter unit 10, receiver unit 12, temperature compensating mechanism 14, and conduits 16, 18, 20, and 22 interconnecting the aforementioned units and the mechanism. The open system includes a fluid motor 24, valve 26, accumulator 28 for storing fluid under pressure from a pump 30, a fluid reservoir 32, and a regulator valve 34 for bypassing fluid to the reservoir when the fluid under pressure in the accumulator reaches a predetermined value. One end of the motor is in communication with the accumulator through conduits 36 and 38; and the other end of the motor is in communication with the reservoir through conduits 40 and 42. The valve 26 is interposed between conduits 36 and 38, and conduits 40 and 42 respectively to control the flow of fluid to the ends of the motor. The regulator valve, which is of a type shown in my application for patent Serial Number 451,593, filed July 20, 1942, now Patent No. 2,420,890, dated May 20, 1947, is interposed between the conduit 38, and conduits 44 and 46, the latter conduits respectively, connecting the regulator valve to the outlet of pump 30 and to the conduit 42. Conduit 48 connects the reservoir to the pump. Conduits 50 and 52 interconnect the open and closed systems for supplying fluid to the latter as desired.

Valves 54 and 56 are located in conduits 50 and 52 respectively for manual control.

The fluid motor 24 includes a cylinder 58 having a piston 60 therein, dividing the cylinder into oppositely disposed chambers 62 and 64, connected to the conduits 36 and 40 respectively. A piston rod 61 has one end fixed to the piston 60 and its other end protruding beyond the end of the cylinder.

To control the flow in the open hydraulic system between the source and the motor 24 the valve 26 is provided. The valve comprises a body 65, with a bore 66 therein. An inlet port 68, cylinder ports 70 and 72, and return port 74 are formed in the body and open into the bore at axially spaced positions therein. The bore 66 is recessed at 76 and 78 to form valve seats 80 and 82 respectively on which co-axially arranged hollow valve members 84 and 86 normally seat to cut off flow to the cylinder 58. A passage 88 connects the recesses 76 and 78 which are axially spaced apart in the bore. A spring 90 is interposed between the inner or adjacent ends of the valve members so as to urge them in opposite directions against the valve seats. For unseating the valve members a rod 92 is provided which extends longitudinally through the bore and is equipped with bushings 94 and 96 constituted to engage one end of one or the other of the hollow valve members 84 and 86 respectively depending upon the direction of movement of the rod. The rod is normally held in a position by spring 98 so that the bushings 94 and 96 are out of engagement with the ends of the hollow valve members to permit communication between the chambers 62 and 64 and the return port 74, via the interior of the hollow valve members.

The transmitter unit 12 comprises a cylinder 100 having a piston 101 therein, dividing the cylinder into two chambers, one at each end thereof. The piston is provided with a rack 102, integral therewith. A shaft 103 is rotatably carried by the cylinder in transverse relationship thereto and provided with gears 104 and 105 fixed to opposite ends of the shaft. A steering device or wheel 106 is splined or otherwise securely fastened to one end of a shaft 107 having a pinion gear 108 suitably secured thereto at the other end for driving engagement with gear 105 to thereby impart reciprocal motion to piston 101 through rotative motion of the wheel. A conduit 110 connects the ends of the cylinder 100. A bleed or centering valve 112 is located in the conduit 110 for manual operation to thereby control communication between the ends of cylinder 100 to permit centering the piston 101 therein.

The receiver unit includes a cylinder 114 having a piston 116 reciprocally positioned therein and dividing the cylinder into two opposed chambers. The cylinder is formed with openings 118 and 120 in its ends for connecting the receiver with the transmitter through conduits 16, 18, 20 and 22. A piston rod 122 is integrally related to the piston and extends through the ends of the cylinder to thereby provide equal effective areas on the opposite sides of the piston. One end of the piston rod 122 is formed at 124 to be fastened to a lever 126. The lever is integral with a collar 128 at one end and is rotatably carried by a shock strut 130. The lever 126 is connected at its other end to the piston rod 61 of the fluid motor. The cylinder 114 of the receiver is movable relative to the piston 116. A lever 132 operatively ties the cylinder 114 and the rod 92 together so that movement of the cylinder operates the valve members 84 and 86. The lever 132 is fulcrumed on a pin 134 carried by a link 136 supported by the valve body 65.

To compensate for pressure changes in the closed hydraulic system due to variation in temperature of the fluid in the system the compensating mechanism 14 is provided. The temperature compensating mechanism per se is claimed in my application Serial Number 704,261, filed Oct. 18, 1946. The mechanism includes a valve member 140 seated in a passage 141 which communicates conduits 16 and 18 with a reservoir 142, the interior of which is divided, by a flexible diaphragm 143, into an upper chamber 144, into which air is pumped under pressure, and a lower chamber 145 in communication with passage 141, whereby any change in volume of fluid in the system is accounted for in the reservoir 142. The valve member 140 has a stem 146 integral with a head 147, which is biased onto a valve seat 148 located in the passage 141, by a spring 149, to thereby normally cut off communication between the chamber 145, and conduits 16 and 18. The valve stem 146 has one end terminating in a passage 150 which connects conduit 20 to conduit 22, to thereby subject said one end of the valve stem to the fluid under pressure existing in the latter conduits. A seal 152 encircles the valve stem to prevent leakage between the passage 150 and conduits 16 and 18, axially along the valve stem. The effective annular area 154 of the valve head formed between the valve seat 148 and the valve stem, and on which the pressure in lines 16 and 18 acts when the valve member is seated, is made equal to the effective area 156 of the valve stem 146 on which the pressure in lines 20 and 22 acts. As shown the spring 149 is selected to exert a force on the valve member equal to substantially one-half the total operating force required for the system. Actually, however, the total force holding the valve member 140 on its seat is the summation of the force of spring 149 plus the pressure of the fluid in chamber 145 acting on the enlarged head 147 of the valve member. A check valve 160 is located in a passage 162 which connects the chamber 145 to conduits 16 and 18, to thereby permit the flow of fluid from the chamber to these conduits but preclude flow in the opposite direction. The conduit 50 is connected into the passage 162 to supply fluid to the closed system when desired. A check valve 164 is interposed between the conduit 50 and the passage 162 to permit flow into passage 162 but prevent flow in the opposite direction. A spring 166 is interposed between the check valves 160 and 164 to urge them against their seats. The manually controlled valves 54 and 56 are arranged to normally disconnect the closed hydraulic system from the source.

The shock strut 130 carried by an airplane, not shown, comprises a pair of telescoping tubes 170 and 172. The tube 170 is equipped with a flange 174 for supporting the rotatable collar 128. A bracket 176 is carried by the tube 170 for supporting the motor 24 and receiver 12. The tube 172 is provided with a collar 178 securely fastened thereto against rotation. A scissors connection 180 connects the rotatable collar 128 to the collar 178 to allow for axial displacement of the tubes relative to each other and to impart rotative movement to tube 172 about its axis to thereby guide a nose wheel or steered member 182, carried by an axle 184 integral with tube 172.

Operation of the apparatus is as follows:

With the parts of the apparatus in the position shown in Figure 1, assume steering wheel 106 is rotated in a direction to move piston 101 to the left. This puts the fluid in conduits 16 and 18, and in the upper end of the receiver cylinder 12 under pressure. Since the resistance offered by the piston, which is drivably connected to the wheel through the aforementioned linkage, is greater than the resistance offered by the cylinder which is operatively connected to the valve rod 92, the latter is moved in response to movement of the cylinder upwardly. That is, upward movement of the cylinder pivots the lever 132 about pin 134 which moves the rod 92 downwardly. Movement of the rod 92 downwardly carries bushing 94 with it into engagement with one end of the hollow valve member 84. Initial engagement between the bushing 94 and the valve member 84 cuts off communication between chamber 64 of the motor and return port 74, through the hollow valve member, and continued movement of the rod downwardly unseats valve member 86 from seat 80 to thereby communicate inlet port 68 with the chamber 64, through passage 88 of the valve body. At this time chamber 62 is in communication with return port 74, via conduit 36, and the interior of hollow valve member 86. This subjects piston 60 to a differential in pressure, with the greater force acting in a direction to move the piston downwardly, thereby rotating the collar 128 which imparts rotation to the tube 172 through the scissors connection 180, whereby wheel 182 is guided. Rotation of lever 126 in a clockwise direction by piston 60 also tends to move receiver piston 116 downwardly within the cylinder, but because of the incompressibility of the fluid medium in the ends of the cylinders 114 and 100, and, in the conduits 20 and 22, the receiver is moved downwardly as a unit pivoting around pin 134. This returns rod 92 to the position shown in the figure. Spring 98 centers the rod 92 in the cylinder and the valve member 84 is seated by spring 90. This arrangement provides a follow up system for cutting off the flow to the motor. To turn the nose wheel 182 back to its original position the steering wheel is rotated in the opposite direction, that is, in a direction to cause movement of piston 101 to the right. Since the operation of the apparatus in the other direction is identical, a further discussion is believed unnecessary.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

I claim:

1. A hydraulically actuated power steering apparatus for an aircraft having a steering device and a steered member, said apparatus comprising a fluid motor drivably connected to said steered member, a source of fluid under pressure having a connection to said motor, a valve in the connection, said valve shiftable from a normally closed position in which the motor is cut off from said source to an open position where communication is established between the source and the motor, a closed hydraulic system including said steering device and a receiver unit responsive to movement of said steering device, a mechanical connection operatively connecting the receiver unit to the valve to move the same to open position to thereby connect the motor to said source, whereupon the motor moves said steered member, means in the closed hydraulic system to compensate for pressure changes therein due to temperature variation of the fluid, and means connecting the motor to the receiver for returning said valve to closed position as the steered member is moved to thereby provide a follow up control.

2. A hydraulic actuated power steering apparatus for an aircraft having a steering device and a steered member, said apparatus comprising a fluid motor drivably connected to said steered member, a source of fluid under pressure having a connection to said motor, a valve in the connection, said valve shiftable from a normally closed position in which the motor is cut off from said source to an open position where communication is established between the source and the motor, a closed hydraulic system including said steering device and a receiver unit responsive to movement of said steering device, a pair of conduits connecting the steering device to said receiver unit, means providing a connection between the receiver unit and valve to move the latter to open position to thereby connect the motor to said source, whereupon the motor moves said steered member, means in the closed hydraulic system for compensating for pressure changes therein due to variations in temperature in fluid and including a device in communication with one of said conduits and operative to effect release of the fluid from said one conduit upon a temperature rise and force fluid thereinto upon a temperature drop, and means connecting the motor to the receiver for returning said valve to closed position upon movement of the steered member.

STANLEY I. MACDUFF.

REFERENCES CITED

The following references are of record in the file of this patent:

UNITED STATES PATENTS

| Number | Name | Date |
|---|---|---|
| 2,252,660 | Kulikoff | Aug. 12, 1941 |
| 2,401,364 | Mercier | June 4, 1946 |
| 2,418,325 | Wassall et al. | Apr. 1, 1947 |
| 2,424,233 | Greenough | July 22, 1947 |

FOREIGN PATENTS

| Number | Country | Date |
|---|---|---|
| 527,013 | Great Britain | Oct. 1, 1940 |